United States Patent Office 3,184,441
Patented May 18, 1965

3,184,441

AIR-DRYING ESTERS OF 1,3-CYCLIC ACETALS

James Chen-Shang Fang, Springfield, Pa., assignor to E. I. du Pont de Nemours and Company, Wilmington, Del., a corporation of Delaware No Drawing. Filed Apr. 6, 1959, Ser. No. 804,098
9 Claims. (Cl. 260—86.1)

This invention relates to a new class of air-drying materials and more particularly to acrylic and methacrylic esters of certain substituted 1,3-cyclic acetals and to coating compositions formed therewith.

"Air-drying materials" as used herein refers to materials which, when deposited as a coating onto a substrate, form films at about room temperature in the presence of air which are not soluble in solvents for the starting materials. Heretofore, most known air-drying materials have been natural products such as, for example, soyabean oil, dehydrated castor oil, linseed oil and the like. These natural products often dry rather slowly, hence coating compositions formed therewith often have to be heated to accelerate their drying. In addition, many natural air-drying materials lack compatibility or desirable film properties.

I have discovered that acrylic and methacrylic esters of certain substituted 1,3-cyclic acetals have excellent air drying properties and, in addition, have other excellent properties which make them particularly adaptable for coating compositions.

Acrylic and methacrylic acid esters of 4-hydroxymethyl-1,3-dioxolanes such as 4-methacryloxymethyl-2,2-dimethyl-1,3-dioxolane are known and are disclosed and claimed in U.S. Patent 2,680,735. However, these esters are not suitable air-drying materials for coating compositions. Primarily, compositions containing these known 1,3-dioxolane esters do not air dry as described hereinbefore; thus, films formed therefrom must be heated to make usable coatings.

The cyclic acetal esters of this invention can be represented by the general formula

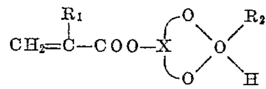

wherein X is a trivalent hydrocarbon radical containing 3 to 20 carbon atoms, at least two of which are in the acetal ring, $R_1$ is a radical selected from the class consisting of hydrogen and methyl radicals and $R_2$ is a radical containing alphamethylenic ($=CH_2$) unsaturation. Acrylate and methacrylate esters of substituted dioxolanes, dioxanes and dioxepanes (i.e., compounds containing 5 to 7 atoms in the acetal ring) are preferred because of the availability of raw materials therefor, because of the ease with which such compounds can be prepared and because of the general over-all balance of air-drying and other film-forming properties of the resulting products.

Examples of radicals represented by $R_2$ are vinyl ($—CH=CH_2$) and alpha-substituted vinyl radicals

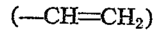

wherein the alpha-substituent is, for example, a radical selected from the group consisting of alkyl such as methyl, ethyl, propyl and butyl; aryl such as phenyl and tolyl; alkenyl such as allyl; acyloxy such as acetoxy, isopropionoxy, butyroxy and benzoyloxy; alkoxy such as methoxy, ethoxy, isopropoxy and butoxy; aryloxy such as phenoxy and 4-methylphenoxy; carbalkoxy such as carbomethoxy and carbethoxy; chloro; chloroalkyl such as chloromethyl, chloroethyl, chloropropyl and chlorobutyl; fluoro; fluoroalkyl such as fluoromethyl, fluoroethyl, fluoropropyl and fluorobutyl; cyano; cyanoalkyl such as cyanomethyl, cyanoethyl, cyanopropyl and cyanobutyl and bromo radicals. Compounds in which $R_2$ is a vinyl radical $$(—CH=CH_2)$$

are particularly preferred. Of all the compounds of this invention, the compounds containing a vinyl substituent in the 2 position in the acetal ring dry the most rapidly and most completely. Furthermore, in the coating compositions described hereinafter containing ethylenically unsaturated monomers, the compounds containing a vinyl substituent in the 2 position are most effective in the smallest quantities.

Preferably, the compounds of this invention are prepared by the process which comprises heating together at a temperature of about 75 to 150° C., and preferably at 80 to 120° C. acrolein or an alpha-substituted acrolein with a trihydroxy alcohol containing 3 to 20 carbon atoms in which the hydroxyl groups are bonded to different carbon atoms in the presence of a suitable catalyst, then trans-esterifying the resulting substituted 1,3-cyclic acetal with a lower alkyl ester of acrylic or methacrylic acid at a temperature of about from 75° to 150° C., and preferably 80 to 120° C. in the presence of a polymerization inhibitor.

Alternately, an epoxy acrylic ester such as glycidyl methacrylate, glycidyl acrylate, 9,10-epoxy stearyl methacrylate or the like can be reacted with acrolein or a substituted acrolein in the presence of an acid catalyst such as boron trifluoride to yield the desired hydroxy-substituted 1,3-cyclic acetals. Another variant of the preferred process is to react an acryl chloride with a hydroxy-substituted 1,3-cyclic acetal prepared as described above in the presence of a hydrogen chloride acceptor such as pyridine, triethylamine or N-methyl morpholine at a temperature, for example, of about from 0 to 20° C.

Considering the preferred process of this invention in more detail, during the reaction of the aldehyde and triol, water is continuously removed from the reaction mixture. This is conveniently done by carrying out the reaction in a solvent such as, for example, benzene, toluene, xylene, hexane, decane, cyclohexane or mixtures thereof. As the reaction proceeds, the solvent and water are distilled from the reaction mixture and separated, then the solvent is refluxed. Preferably, the reaction is carried out in the presence of an acidic catalyst. Although acid catalysts such as p-toluene sulfonic acid, orthophosphoric acid, boron trifluoride, stannic chloride or mixtures thereof can be used per se in very small portions, preferably, mildly acidic compounds such as ammonium chloride and oxalic acid, or small portions of strong mineral acids deposited on highly porous solid carriers such as highly porous silica-alumina carriers are used because they minimize side reactions through the acetal ring. Usually depending on what particular catalyst is used, about from 0.5 to 5% and preferably about 1% by weight of catalyst based on the triol is used. A polymerization inhibitor such as, for example, hydroquinone, catechol, beta-naphthylamine, dibeta-naphthyl phenylene diamine or mixtures thereof are also preferably added to the reaction mixtures. Inhibitors such as hydroquinone and catechol, which can be easily removed after the reaction with an alkaline wash, are particulary preferred.

Triols which can be used in preparing the compounds of this invention are, for example, hexane-1,2,6-triol, heptane-1,2,7-triol, octane-1,2,8-triol, decane-1,2,10-triol, glycerol, butane-1,2,4-triol, pentane-1,2,5-triol, hexane-1,3,6-triol, heptane,1,4,7-triol, 4-methylol heptane-1,7-diol, undecane-1,6,11-triol, 1,1,1-trimethylol ethane, 1,1,1-trimethylol propane, octadecane-1,9,10-triol- trimethylol phenyl methane, trimethylol hexyl methane, and mixtures thereof.

Examples of aldehydes are acrolein and substituted acroleins such as methacrolein, alpha-butylacrolein, alpha-phenylacrolein, alpha-(p-tolyl) acrolein, alpha-allylacrolein, alpha-acetoxyacrolein, alpha-butyroxyacrolein, alpha-methoxyacrolein, alpha-butoxyacrolein, alpha-phenoxyacrolein, alpha-(p-tolyloxy) acrolein, alpha-carbomethoxyacrolein, alpha-carbethoxyacrolein, alpha-chloroacrolein, alpha-chloromethylacrolein, alpha-chloroethylacrolein, alpha - fluoroacrolein, alpha - fluoromethylacrolein, alpha-fluoroethylacrolein, alpha-cyanoacrolein, alpha-cyanomethylacrolein, alpha-cyanoethylacrolein, alpha-bromo acrolein and mixtures thereof.

The aldehyde-triol reaction usually takes about from 2 to 10 hours to run to completion. After the reaction is substantially completed, the crude product can be purified by neutralizing the reaction mixture with a base such as, for example, sodium hydroxide or sodium acetate, then distilling the product under reduced pressure.

As stated hereinbefore, preferably the preparation of the monomeric compounds of this invention is completed by transesterifying the hydroxy-substituted 1,3-cyclic acetals with a lower alkyl ester, for example, an ethyl or methyl ester, of acrylic or methacrylic acid or a mixture thereof. In the transesterification step, a catalyst such as, for example, sodium methylate, lime, litharge, lithium hydroxide, potassium hydroxide or mixtures thereof is preferably used. Usually, depending on what particular catalyst is used, about 1% by weight of catalyst based upon the hydroxy-substituted 1,3-cyclic acetal is added. The aforementioned polymerization inhibitors are also added in like amount to prevent the vinyl polymerization of the unsaturated reactants and products.

Preferably, the esterification is carried out in a solvent such as one of the aforementioned inert solvents used in forming the hydroxy-substituted 1,3-cyclic acetals. During the reaction, solvent and alcohol by-product are distilled from the reaction mixture. The crude ester product can be purified by neutralizing the reaction mixture and distilling the product under reduced pressure.

Instead of preparing the products of this invention by the preferred two-step procedure just outlined, they can be prepared by adding a lower alkyl ester of acrylic or methacrylic acid directly to the crude reaction mixture containing the hydroxy-substituted 1,3-cyclic acetals. By this modified procedure, purification of the crude reaction mixture is eliminated.

The products of this invention can be used in coating compositions alone or in admixture with other film-forming materials such as, for example, polymerized esters of acrylic and methacrylic acid, oil-modified alkyd resins, alkylated amino-aldehyde resins, phenol-aldehyde resins and natural and synthetic oils. Usually, at least about 20% based on the total weight of film-forming material of the cyclic acetal esters of this invention is used. Besides the solvent and film-forming materials, conventional additives and modifiers for the coating compositions such as, for example, pigments, plasticizers, inhibitors, dispersing agents, flow control agents and the like also can be added in amounts normally employed in coating compositions.

The compounds of this invention can be mixed with ethylenically unsaturated monomeric materials which are neither air-drying nor film-forming materials per se to yield compositions which air dry readily to yield solvent-insoluble films and coatings. Examples of such ethylenically unsaturated monomers are glycol dimethacrylate, tetramethylene glycol dimethacrylate, vinyl methacrylate, vinyl acrylate, divinyl benzene, glycerine trimethacrylate, pentaerythritol tetramethacrylate, divinyl sulfone, hexatriene, triethylene glycol dimethacrylate, glycol diacrylate, ethylene glycol divinyl ether, diallyl phthalate, divinyl dimethyl silane, glycerol trivinyl ether, 2-ethylhexyl methacrylate, octadecyl methacrylate, butyl methacrylate, cyclohexyl methacrylate, benzyl methacrylate, octyl acrylate, 2-ethylhexyl acrylate, hexyl acrylate, cyclohexyl acrylate, benzyl acrylate and mixtures thereof. Monoethylenically unsaturated esters of acrylic and methacrylic acid, particularly the 6 to 20 carbon-atom esters thereof, and diethylenically unsaturated compounds such as divinyl benzene, polyalkyleneether glycol acrylates and methacrylates such as triethylene glycol dimethacrylate and diacrylate are preferred.

Usually, at least about 20% and preferably at least about 50% by weight of the compounds of this invention based on the total weight of film-forming materials are used. When solid or sparingly soluble ethylenically unsaturated compounds such as methylene bismethacrylamide, methylene bisacrylamide and triallyl cyanurate are used, enough of the compounds of this invention must be added thereto so that the ethylenically unsaturated additive does not separate or crystallize during drying.

Coating compositions, such as varnishes, enamels and primers containing the products of this invention or mixtures thereof can be used on a wide variety of substrates such as, for example, wood, glass and metals such as steel, aluminum and copper. The resulting dried coatings are strong, flexible and solvent water resistant.

The coating compositions containing the products of this invention have outstanding air-drying properties. When they are applied to substrates and exposed to air at room temperature, the coatings containing the air-drying materials of this invention become substantially completely dry and solvent resistant without heating within a few days. Pigments usually accelerate the drying to the tack-free state. Small amounts, usually about 1% by weight based on the air-drying materials of conventional drying accelerators such as, for example, cobalt naphthanate and other siccative metal salts are added to the compositions.

Uniquely, compositions formed with the compounds of this invention dry or insolubilize whether they are applied in very thick or very thin films, for example, from a fraction of a mil up to ¼ inch or more thick. The drying mechanism in thin films or at the surface of thick films is believed to be a truly air-drying mechanism, that is an oxygen catalyzed mechanism, while the drying in the interior of very thick films is believed to be a somewhat different mechanism and is oxygen inhibited. Thus, for example, compositions containing the compounds of this invention can be applied to substrates having deep gouges or holes with the assurity that the entire coating will dry and insolubilize throughout. This property also makes it possible to use the compositions of this invention as potting compounds. To accelerate the drying in the interior of thick films, catalyst such as, for example, benzoyl peroxide, di(tertiarybutyl)peroxide, tertiarybutyl hydroperoxide, tertiarybutyl perbenzoate, stearoyl peroxide, ascaridol, cumene hydroperoxide, ammonium persulfate, azobisisobutyronitrile or mixtures thereof can be added to the compositions in small portions.

This application is a continuation-in-part of my copending application Serial No. 644,181, filed March 5, 1957, now abandoned.

The following examples are intended to illustrate the invention and not to limit it in any way. Parts and percentages are by weight unless otherwise specified.

*Example 1*

About 286 parts of hexane-1,2,6-triol, 150 parts of toluene and 1.9 parts of a catalyst comprising porous silica-alumina carrier ("Mobilbead W," a product of the Socony Mobile Oil Company) on which is deposited 0.2 millimole per unit weight of carrier of orthophosphoric acid are charged to a reaction vessel equipped with a reflux condenser and water separator. About 125 parts of acrolein are added slowly to the reaction mixture while water, toluene and acrolein are continuously azeotropically distilled at about 110° C. The water is separated and the acrolein and toluene were returned to the reaction vessel. The reaction is continued for 4 hours, then the low boiling materials are distilled therefrom. Finally, the product, 4(4'-hydroxybutyl)-2-vinyl-1,3-dioxolane is distilled from the reaction mixture at about from 100 to 130° C. at a pressure of about 1.0 millimeter of mercury absolute.

About 103 parts of the hydroxy-substituted 1,3-dioxolane prepared as described above, about 2 parts of sodium methylate and 4 parts of hydroquinone polymerization inhibitor are charged to a reaction vessel equipped with distilling column and heated to 125° C. Next, 360 parts of methyl methacrylate are added to the reaction mixture at a rate sufficient to keep the reaction temperature at about 125 to 135° C. over a period of about 2 hours. The resulting crude 4(4'-methacryloxybutyl)-2-vinyl-1,3-dioxolane is next diluted with about 40 parts of hexane and 100 parts of toluene, washed successively five times with a 10% sodium hydroxide solution, once with a saturated salt solution and twice with water. The organic phase is then dried over anhydrous calcium sulfate, filtered and distilled to yield refined 4(4'-methacryloxybutyl)2-vinyl-1,3-dioxolane having a boiling point at about 1 millimeter of mercury absolute of about 100 to 103° C. and a refractive index of about from 1.4621 to 1.4623. The resulting product has the following analysis:

| | Experimental | Calculated |
|---|---|---|
| Saponification equivalent | 243 | 243.3 |
| Hydroxyl equivalent | 0.12 | 0.00 |
| Percent carbon | 64.93 | 64.98 |
| Percent hydrogen | 7.16 | 8.39 |

*Example 2*

Fifty-six parts of acrolein are mixed with 134 parts of hexane-1,2,6-triol, 0.5 parts of hydroquinone and 2 parts of para-toluene sulfonic acid and heated at 55° C. for about 1 hour. The reaction mixture is washed with a dilute sodium hydroxide-sodium chloride solution, then, after 2 parts of hydroquinone are added, the resulting mixture is fractionated. Fifty parts of 4(4'-hydroxybutyl)-2-vinyl-1,3-dioxolane are recovered.

A vessel equipped with an agitator, thermometer and a fractionating column is charged with about 50 parts of the aforementioned 4(4'-hydroxybutyl)-2-vinyl-1,3-dioxolane, 125 parts of methyl methacrylate, 0.5 parts of hydroquinone and 5 parts of a 5 weight percent solution of sodium methylate in methanol. The reaction mixture is heated under a nitrogen blanket for 2 hours at its reflux temperature. Next 5.5 more parts of the sodium methylate solution are added to the reaction mixture and heating is continued for about one more hour at the reflux temperature. Finally, the reaction mixture is cooled, neturalized with Dry Ice and distilled under reduced pressure to yield 4(4'-methacryloxybutyl)-2-vinyl-1,3-dioxolane.

In correlating the products of Examples 1 and 2 with the structural formula given hereinbefore, $R_1$ is $CH_3$, $R_2$ is $-CH=CH_2$ and X is

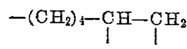

*Example 3*

About 150 parts of 4(4'-hydroxybutyl)-2-vinyl-1,3-dioxolane prepared as described in Example 1, 200 parts of ethyl acrylate, 5 parts of hydroquinone and 5 parts of tetraisopropyl titanate are refluxed for 8 hours. During the reaction ethanol is continuously distilled from the reaction mixture. Finally, the reaction mixture is distilled at a pressure of about 1.0 millimeter of mercury, washed twice with a 5% sodium hydroxide solution and twice with distilled water to yield about 120 parts of 4(4'-acryloxybutyl)-2-vinyl-1,3-dioxolane.

*Example 4*

67 parts of 4(4'-hydroxybutyl)-2-vinyl-1,3-dioxolane prepared as described in Example 1 are dissolved in a mixture of 150 parts of diethyl ether and 60 parts of pyridine and added with stirring at 0° C. to 45.3 parts of acrylyl chloride in 100 parts of diethyl ether. The mixture is stirred and allowed to come to room temperature over a period of 6 hours. The precipitated hydrochloride is filtered off, then the filtrate is washed several times with distilled water, dried over anhydrous magnesium sulfate, filtered and freed of solvent by heating at 60° C. under a pressure of about 1 to 100 millimeters of mercury absolute. About 110 parts of 4(4'-acryloxybutyl)-2-vinyl-1,3-dioxolane are obtained.

*Example 5*

276 parts of glycerol, 245 parts of methacrolein, 150 parts of benzene and 3 parts of oxalic acid are refluxed at a temperature of 77–91° C. for 8 hours. During the reaction, water, methacrolein and benzene are continuously removed from the reaction mixture, and the water is separated therefrom and the methacrolein and benzene are returned to the reaction vessel. During the reaction, 42 parts of water are removed. The resulting reaction mixture is stripped of excess methacrolein and benzene by flash distillation to yield 278 parts of crude product, then distilled at about 51 to 65° C. at a pressure of 0.3 to 0.4 millimeter of mercury absolute to yield a mixture of 4-hydroxy methyl-2-isopropenyl-1,3-dioxolane and 5-hydroxy-2-isopropenyl-1,3-dioxane.

144 parts of the above mixture of 1,3-cyclic acetals, 200 parts of methyl methacrylate, 200 parts of toluene, 5 parts of hydroquinone and 3 parts of sodium methoxide are refluxed for 8 hours. During the reaction, about 46 parts of ethanol/toluene binary are continuously removed. The resulting solution is freed of excess methyl methacrylate and toluene and distilled under vacuum, washed twice with 5% sodium hydroxide solution and twice with distilled water to yield 120 parts of a mixture of 4-methacryloxymethyl-2-isopropenyl-1,3-dioxolane and 5-methacryloxy-2-isopropenyl-1,3-dioxane.

*Example 6*

5-hydroxymethyl-5-methyl-2-vinyl-1,3-dioxane is prepared by the general procedure described in Example 1 used for preparing 4(4'-hydroxybutyl)-2-vinyl-1,3-dioxolane using 240 parts of trimethylol ethane instead of the 268 parts of hexane-1,2,6-triol used therein. About 253 parts of 5-hydroxymethyl-5-methyl-2-vinyl-1,3-dioxane boiling between about 66 and 68° C. at a pressure of 0.2 millimeters of mercury absolute is obtained.

316 parts of the 5-hydroxymethyl-5-methyl-2-vinyl-1,3-dioxane described above are mixed with 15 parts of hydroquinone, 6 parts of sodium methoxide, charged to a reaction vessel and heated at 125 to 135° C., then 1,000 parts of methyl methacrylate are added thereto over a period of about 1 hour at a rate sufficient to maintain the reaction temperature at about 125 to 135° C. The resulting mixture is flash distilled to remove unreacted monomer, then distilled at reduced pressure to yield 390 parts of crude product boiling between 75 and 113° C. at 0.1 to 0.8 millimeter of mercury absolute. The crude product is redistilled at a temperature of 78 to 80° C. at a pressure of 0.07 to 0.1 millimeter of mercury absolute. Finally, the resulting mixture is washed 5 times with 50 parts of 5% sodium hydroxide solution, twice with distilled water, dried over magnesium sulfate, filtered and stripped of low-boiling materials. 229 parts of water-white product having a refractive index of 1.4655 are obtained.

A coating composition is prepared by adding 0.05% of $Co^{+2}$ in the form of cobalt butyl phthalate and a trace of tertiarybutyl hydroperoxide to the product described above, then the resulting composition is coated onto glass panels at a dry film thickness of 2.5 mils. The film begins to body considerably after about 6 hours and is completely tack free and insoluble in toluene after 48 hours. Thick films of this material, for example, 1/32 to 1/16 inch thick, dry readily to a tack-free state in a much shorter time.

*Example 7*

2-isopropenyl-5-(n-octyl)-1,3-dioxolane-4-octanol is prepared by reacting 302 parts of octadecane-1,9,10-triol with 70 parts of methacrolein under conditions similar to those used in Example 1 for preparing 4-(4'-hydroxybutyl)-2-vinyl-1,3-dioxolane.

177 parts of the hydroxy substituted 1,3-cyclic acetal described above is mixed with 4 parts of hydroquinone and 4 parts of sodium methylate and heated to 125 to 135° C. 500 parts of methyl methacrylate are added thereto over a period of one hour at a rate sufficient to maintain the reaction mixture at 125 to 135° C. while methyl methacrylate and methanol are continuously distilled therefrom. The resulting product is stripped free of volatiles by heating at a temperature of about 125° C. under a pressure of less than about 1 millimeter of mercury for 15 minutes. The resulting residue is dissolved in 200 parts of hexane, washed once with a 20% sodium hydroxide solution, once with a 15% sodium chloride solution and twice with distilled water, dried over magnesium sulfate, filtered and stripped of low boiling materials at a temperature of about 60° C. and a pressure of less than 0.1 milimeter of mercury, for 30 minutes. This material dries somewhat more slowly than products of the preceding examples.

In correlating the product of this example, 4-(8'-methacryloxyoctyl)-2-isopropenyl-5-(n-octyl)-1,3-dioxolane with the general formula given hereinbefore, $R_1$ is $CH_3$, $R_2$ is $$-\underset{\displaystyle CH_3}{\underset{|}{C}}=CH_2$$

and X is

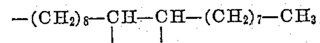

*Example 8*

182 parts of trimethylol phenyl methane (formed by the reaction of excess formaldehyde with phenyl acetaldehyde) 90.5 parts of alpha-chloroacrolein, about 2 parts of the catalyst described in Example 1 and 150 parts of toluene are charged to a reaction vessel equipped with a reflux condenser and water separator. About 90.5 parts of alpha-chloroacrolein are addded slowly to the reaction mixture while water, toluene and alpha-chloroacrolein are continuously azeotropically distilled therefrom. The water is separated and the alpha-chloroacrolein and toluene are returned to the reaction vessel. The reaction is continued for about 4 hours, then the reaction mixture is distilled at reduced pressure to yield 5-hydroxymethyl-2-alphachlorovinyl-5-phenyl-1,3-dioxane. The resulting product is transesterified with about 1,000 parts of methyl methacrylate by the general procedure described in Example 1 to yield 5-methacryloxymethyl-2-alphachlorovinyl-5-phenyl-1,3-dioxane.

*Example 9*

A mixture of 500 parts of acrolein, 2 parts of 85% orthophosphoric acid and 1 part of hydroquinone are heated to about 52° C. Next, 142 parts of glycidyl methacrylate are added dropwise over a period of ½ hour while the reaction mixture is refluxed, then the reaction is continued for another hour while the temperature rises to about 62° C. The resulting product is dried with 4 parts of calcium oxide and distilled under reduced pressure to remove the excess acrolein and other volatiles. 140 parts (71% of the theoretical yield) of 4-methacryloxymethyl-2-vinyl-1,3-dioxolane boiling at about 93° C. at a pressure of 1 millimeter of mercury absolute are recovered. The product has substantially the following analysis:

| | Experimental | Calculated |
|---|---|---|
| Percent carbon | 68.19 | 68.6 |
| Percent hydrogen | 7.03 | 7.07 |
| Saponification number | 283 | 281 |
| Refractive index 25° F | 1.4620 | |
| Specific gravity 25° C | 1.0863 | |

*Example 10*

162 parts of 4-methylol heptane-1, 7-diol, 81 parts of alpha-cyanoacrolein, 200 parts of benzene and 6 parts of oxalic acid are refluxed for about 8 hours. During the reaction, water, alpha-cyanoacrolein and benzene are continuously removed from the reaction mixture and the alpha-cyanoacrolein and benzene are returned thereto. The resulting reaction mixture is stripped of excess alpha-cyanoacrolein and benzene by flash distillation and then fractionated under reduced pressure to yield 4(4'-hydroxybutyl)-2-(alpha-cyanovinyl)-1,3-dioxocane.

About 200 parts of the 4(4'-hydroxybutyl)-2-(alpha-cyanovinyl)-1,3-dioxocane prepared above, 200 parts of ethyl acrylate, 5 parts of hydroquinone, and 5 parts of tetraisopropyl titanate are refluxed for 8 hours. During the reaction ethanol by-product is continuously removed. The resulting product is distilled under vacuum, washed twice with 5% sodium hydroxide solution and twice with distilled water to yield 4(4'-acryloxy-butyl)-2-(alpha-cyanovinyl)-1,3-dioxocane.

*Example 11*

162 parts of 1,1,1-trimethylol pentane, 96 parts of alpha-allylacrolein, 150 parts of benzene and 3 parts of oxalic acid are refluxed for about 5 to 10 hours. During the reaction, alpha-allylacrolein, water and benzene are continuously removed from the reaction mixture, the water is separated and the alpha-allylacrolein and benzene returned thereto. The resulting reaction mixture is stripped of excess alpha-allylacrolein and benzene by flash distillation and fractionated under reduced pressure to yield 5-(hydroxymethyl)-5-(n-butyl)-2-(alpha-allylvinyl)-1,3-dioxane.

Next, about 240 parts of the hydroxy-substituted 1,3-acyclic acetal described above, 200 parts of ethyl acrylate, 5 parts of hydroquinone, and 5 parts of tetraisopropyl titanate are refluxed for 8 hours. During the reaction, the methanol by-product is continuously removed. The resulting product is distilled under vacuum, washed twice with 5% sodium hydroxide solution, twice with distilled water to yield 5-(acryloxymethyl)-5-(n-butyl)-2-(alpha-allylvinyl)-1,3-dioxane.

*Example 12*

92 parts of glycerol are reacted with 132 parts of alpha-phenylacrolein by the general procedure described in Example 1 to yield a mixture of 4-hydroxymethyl-2-(alpha-phenylvinyl)-1,3-dioxolane and 5-hydroxy-2-(alpha-phenylvinyl)-1,3-dioxane. The resulting product is then transesterified with methyl methacrylate by the general procedure described in Example 1 to yield a mixture of 4-(methacryloxymethyl)-2-(alpha-phenylvinyl)-1,3-dioxolane and 5-methacryloxy-2-(alpha-phenylvinyl)-1,3-dioxane.

Examples 13 to 19 which follow are performed by the general procedure described in Example 1 using the indicated materials.

*Example 13*

74 parts of alpha-fluoroacrolein derived from the reaction of sodium fluoride with the tosylate of pyruvic aldehyde are reacted with 134 parts of hexane-1,2,6-triol, then transesterified with methyl methacrylate to yield 4-(4'-methacryloxybutyl)-2-(alpha-fluorovinyl)-1,3-dioxolane.

*Example 14*

135 parts of alpha-bromoacrolein prepared by the dehydrobromination of dibromoacrolein with triethylamine are reacted with 134 parts of hexane-1,2,6-triol, then transesterified with methyl methacrylate to yield 4-(4'-methacryloxybutyl)-2-(alpha-bromovinyl)-1,3-dioxolane.

*Example 15*

86 parts of alpha-methoxyacrolein obtained by the relation of formaldehyde with beta-methoxyacetaldehyde are reacted with 134 parts of hexane-1,2,6-triol, then transesterified with methyl methacrylate to yield 4-(4'-methacryloxybutyl)-2-methoxyvinyl-1,3-dioxolane.

*Example 16*

162 parts of alpha-(p-tolyloxy)-acrolein obtained by the reaction of formaldehyde with beta-(p-tolyloxy) acetaldehyde are reacted with 134 parts of hexane-1,2,6-triol, then transesterified with methyl methacrylate to yield 4-(4'-methacryloxybutyl)-2-[alpha-(p-tolyloxy) vinyl]-1,3-dioxolane.

*Example 17*

128 parts of alpha-carbethoxyacrolein derived from the oxidation of methyl methacrylate with selenium dioxide are reacted with 134 parts of hexane-1,2,6-triol, then transesterified with methyl methacrylate to yield 4-(4'-methacryloxybutyl)-2-carbethoxyvinyl-1,3-dioxolane.

*Example 18*

128 parts of alpha-acetoxyacrolein obtained by the acetylation of pyruvic aldehyde are reacted with 134 parts of hexane-1,2,6-triol, then transesterified with methyl methacrylate to yield 4-(4'-methacryloxybutyl)-2-(alpha-acetoxyvinyl)-1,3-dioxolane.

*Example 19*

102 parts of alpha-fluoromethylacrolein obtained by the reaction of formaldehyde with beta-fluoropropionaldehyde are reacted with 134 parts of hexane-1,2,6-triol, then transesterified with methyl methacrylate to yield 4-(4'-methacryloxybutyl)-2-(alpha-fluoromethylvinyl)-1,3-dioxolane.

*Example 20*

Using the general procedure described in Example 1 134 parts of hexane-1,2,6-triol are reacted with 109 parts of alpha-cyanoethylacrolein derived from the cyanoethylation of beta-chloropropionaldehyde followed by dehydrochlorination. The resulting hydroxy-substituted 1,3-dioxolane is then reacted with 100 parts of ethyl acrylate to yield 4-(4'-acryloxybutyl) - 2 - cyanoethyl-1,3-dioxolane.

*Example 21*

Using the general procedure described in Example 1, 148 parts of heptane-1,4,7-triol are reacted with about 105 parts of alpha-chloromethylacrolein derived from the reaction of formaldehyde with beta-chloropropionaldehyde, then transesterified with 100 parts of ethyl acrylate to yield 4-(3'-acryloxypropyl)-2-(alpha-chloromethylvinyl)-1,3-dioxepane.

*Example 22*

Coating compositions are prepared by mixing 4-methacryloxymethyl-2-vinyl-1,3-dioxolane with the following materials:

| Composition A: | Parts |
|---|---|
| 4-methacryloxymethyl-2-vinyl-1,3-dioxolane | 70 |
| Octadecyl methacrylate | 30 |
| Cobalt naphthenate | 2.5 |

The cyclic acetal ester is blended with the octadecyl methacrylate, then the cobalt naphthenate is mixed therewith. Test panels sprayed with a film of Composition A having a dry-film thickness of about 2.5 mils dry to a hard, tack-free and solvent-resistant state within about 3 days at room temperature.

The cobalt naphthenate used in this and the following compositions is a solution in aliphatic petroleum naphtha containing about 6% of combined cobalt.

| Composition B: | Parts |
|---|---|
| 4-methacryloxymethyl-2-vinyl-1,3-dioxolane | 50 |
| 2-ethylhexyl acrylate | 50 |
| Cobalt naphthenate | 2.5 |

The cyclic acetal ester is blended with the 2-ethylhexyl acrylate, then the cobalt naphthenate is blended therewith. Test panels sprayed with a 2.5 mil (dry) film of the resulting composition dry to a hard, tack-free and solvent resistant state within about 32 hours at room temperature.

| Composition C: | Parts |
|---|---|
| 4-methacryloxymethyl-2-vinyl-1,3-dioxolane | 50 |
| 2-ethylhexyl acrylate | 50 |
| Red lead pigment | 330 |
| Cobalt naphthenate | 2.5 |

A mill base is formed by grinding the pigment with the 2-ethylhexyl acrylate until a smooth dispersion is formed, then the cyclic acetal ester and cobalt naphthenate are successively blended therewith. Test panels having a 2.5-mil dry coating of this composition air-dry to a tack-free and solvent resistant state within about 24 hours.

| Composition D: | Parts |
|---|---|
| 4-methacryloxymethyl-2-vinyl-1,3-dioxolane | 50 |
| Triethylene glycol dimethacrylate | 10 |
| Cobalt naphthenate | 2.5 |

The cyclic acetal ester is mixed with the triethylene glycol dimethacrylate, then the cobalt naphthenate is blended therewith. Films of the resulting composition air-dry to a tack-free state within 20 hours and are completely dry within about 28 hours.

| Composition E: | Parts |
|---|---|
| 4-methacryloxymethyl-2-vinyl-1,3-dioxolane | 50 |
| Divinyl benzene | 10 |
| Cobalt naphthenate | 2.5 |

The cyclic acetal ester is mixed with the divinyl benzene, then the cobalt naphthenate is blended therewith. Films of this composition dry to a tack-free state within about 20 hours and are hard and solvent resistant within about 40 hours.

| Composition F: | Parts |
|---|---|
| 4-methacryloxymethyl-2-vinyl-1,3-dioxolane | 50 |
| Polymer of butyl methacrylate ("Acryloid" B-82, Rohm and Haas Company) | 50 |
| Toluene | 67 |
| Cobalt naphthenate | 2.5 |

The cyclic acetal ester is blended with a solution of the polymer of butyl methacrylate in the toluene, then the cobalt naphthenate is added thereto. Films about 0.5 to 1.0 mil thick (dry) are tack free within about 16 hours.

| Composition G: | Parts |
|---|---|
| 4-methacryloxymethyl-2-vinyl-1,3-dioxolane | 12.8 |
| Linseed oil | 15.0 |
| Red lead pigment | 164.6 |
| Cobalt naphthenate | 1.0 |

A mill base is formed by grinding the linseed oil with the pigment until a smooth, uniform dispersion is formed. Next, the cyclic acetal ester and cobalt naphthenate are added successively thereto. This composition is particularly suitable as a brush coating composition for severely rusted structural steel.

If an equal quantity of any of the other cyclic acetal esters described hereinbefore are substituted for the 4-methacryloxymethyl-2-vinyl-1,3-dioxolane used in the compositions of this example, substantially similar results are obtained.

*Example 23*

175 parts of methacrolein, 0.5 part of hydroquinone and 5.75 parts of 85% orthophosphoric acid solution are charged to a reaction vessel and heated to the reflux temperature, 72° C. Next, 71 parts of glycidyl methacrylate containing 0.1% of hydroquinone are added thereto while the reaction mixture is refluxed. At the end of this period, the reaction temperature is about 81° C. The resulting 4-methacryloxymethyl-2-isopropenyl-1,3-dioxolane is dried with calcium oxide, filtered and fractionated under reduced pressure.

The following coating compositions are prepared from the 4-methacryloxymethyl - 2-isopropenyl-1,3-dioxolane prepared as described above:

| Composition A: | Parts |
|---|---|
| 4 - methacyloxymethyl-2-isopropenyl-1,3-dioxolane | 50 |
| 2-ethylhexyl acrylate | 50 |
| Cobalt naphthenate (same as Example 22) | 2.5 |

The 2-ethylhexyl acrylate is mixed with the cyclic acetal ester, then the cobalt naphthenate is blended therewith. Films of Composition A about 2.5 mils thick (dry) achieve a tack-free state in about 24 hours and are completely dry within about 40 hours when they are exposed to air at about room temperature.

| Composition B: | Parts |
|---|---|
| 4 - methacryloxymethyl-2-isopropenyl-1,3-dioxolane | 50 |
| 2-ethylhexyl acrylate | 50 |
| Red lead pigment | 330 |
| Cobalt naphthenate (same as Example 22) | 2.5 |

The 2-ethylhexyl acrylate is milled with the pigment until a smooth uniform dispersion is obtained, then the cyclic acetal ester and cobalt naphthenate are added successively thereto. Films of the resulting composition dry to a hard, tack-free insoluble state within about 42 hours.

| Composition C: | Parts |
|---|---|
| 4-methacryloxymethyl-2 - isopropenyl - 1,3 - dioxolane | 50 |
| Octadecyl methacrylate | 50 |
| Iron oxide | 145 |
| Cobalt naphthenate (same as Example 22) | 2.5 |

The octadecyl methacrylate is milled with the iron oxide to form a mill base, then the cyclic acetal ester and cobalt naphthenate are blended successively therewith.

I claim:

1. An air-drying chemical compound represented by the formula:

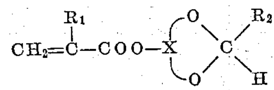

wherein X is a trivalent hydrocarbon radical containing 3 to 20 carbon atoms, 2 to 5 of which are in the acetal ring, $R_1$ is selected from the class consisting of hydrogen and methyl and $R_2$ is a radical selected from the class consisting of vinyl and alpha-substituted vinyl.

2. A compound of claim 1 wherein $R_1$ is —H.

3. A compound of claim 1 wherein $R_1$ is $—CH_3$.

4. A compound of claim 1 wherein X is a hydrocarbon radical containing 3 to 20 carbon atoms and said acetal ring contains 5 to 7 atoms.

5. A compound of claim 1 wherein $R_2$ is $—CH=CH_2$.

6. An air-drying chemical compound represented by the formula:

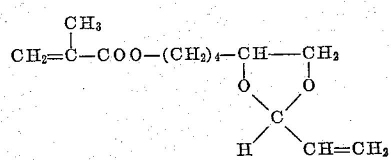

7. An air-drying coating composition consisting essentially of at least about 20%, by weight, of at least one compound of claim 1.

8. An air-drying coating composition consisting essentially of at least about 20% by weight of at least one compound of claim 1 and a member selected from the class consisting of monoethylenically unsaturated esters of acrylic and methacrylic acid, divinyl benzene and polyalkyleneether glycol acrylates and methacrylates.

9. A process for producing compounds of the formula:

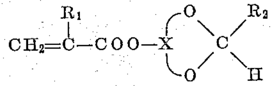

wherein X is a trivalent hydrocarbon radical containing 3 to 20 carbon atoms, 2 to 5 of which are in the acetal ring, $R_1$ is selected from the class consisting of hydrogen and methyl and $R_2$ is a radical selected from the class consisting of vinyl and alpha-substituted vinyl, said process comprising heating (*a*) a 1,3-cyclic acetal of the formula

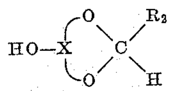

wherein X and $R_2$ are defined as above, with (*b*) a member of the class consisting of methyl and ethyl esters of acrylic and methacrylic acid, at a temperature of about 75–150° C., in the presence of a polymerization inhibitor.

References Cited by the Examiner

UNITED STATES PATENTS

| | | | |
|---|---|---|---|
| 2,401,776 | 6/46 | Rothrock | 260—67 |
| 2,680,735 | 6/54 | Fegley et al. | 260—86.1 |
| 2,877,215 | 3/59 | Fang | 260—86.1 |
| 2,888,492 | 5/59 | Fischer et al. | 260—67 |

JOSEPH L. SCHOFER, *Primary Examiner.*

D. ARNOLD, H. N. BURSTEIN, LEON J. BERCOVITZ, *Examiners.*